March 18, 1930.  S. RUBEN  1,751,360
ELECTRIC CURRENT RECTIFIER
Original Filed Sept. 22, 1924
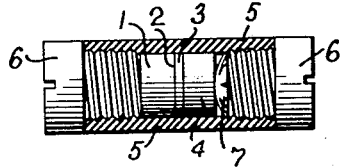
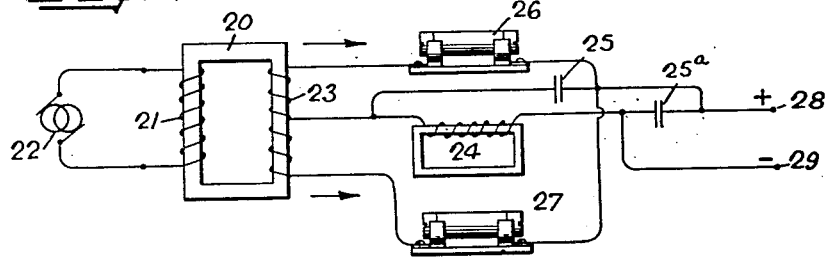
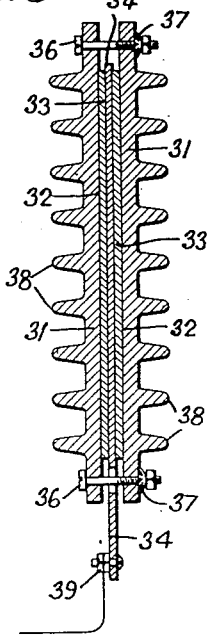
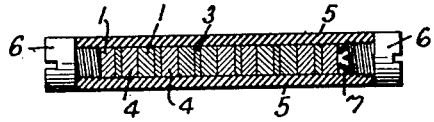
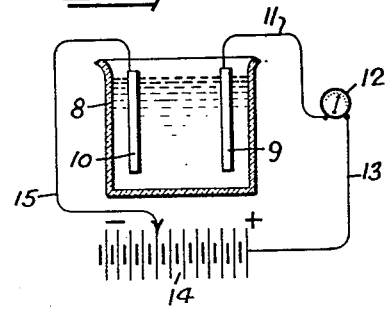
INVENTOR.
Samuel Ruben
BY
Mayer, Warfield Watson
ATTORNEYS.

Patented Mar. 18, 1930

1,751,360

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC-CURRENT RECTIFIER

Original application filed September 22, 1924, Serial No. 739,188. Divided and this application filed April 29, 1926. Serial No. 105,404.

This invention relates to methods of producing electrodes for electric current rectifiers, and particularly to rectifiers of the dry surface-contact variety.

Rectifiers of this type or variety are characterized by the use of an electrode of electropositive material such as aluminum connected in circuit with another electrode through an intermediate layer of a sulphur compound and depend for their operation upon the presence of a current blocking or rectifying film on one of the electrodes. Such rectifiers heretofore available have been low in efficiency and limited in their use to small currents, becoming unstable after a short period of use.

The object of the invention is to provide a ready and efficient procedure adapted to manufacturing processes by which electrodes for dry surface-contact rectifiers may be produced having the proper surface characteristics to give good rectification over relatively long periods of time.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

This application is a division of my copending application, Serial No. 739,188 filed September 22, 1924.

For a fuller understanding of the nature and objects of the invention reference should be had to the following detailed description taken in connection with the accompanying drawing, in which:

Figure 1 is an axial, cross-sectional view of a rectifier embodying electrodes made in accordance with the procedure of the present invention;

Fig. 2 shows, diagrammatically, an electric system in which rectifiers embodying electrodes of the present invention are being used;

Fig. 3 shows in section a modified form of rectifier using electrodes of the present invention;

Fig. 4 shows in section still another form of rectifier in which the several elements are in series and adapted for relatively high voltages; and Fig. 5 is a diagram illustrating the method of forming the film on one of the electrodes.

Referring to the drawings and first to Fig. 1, an electrode 1 of an electropositive material, preferably one of aluminum having a resistance coating of sulphide indicated at 2, is placed in contact with a second or electronegative element in the form of a plate or disk shown at 3, and composed preferably of cupric sulphide (CuS) and having its opposite face placed in contact with another element 4, which is a good conductor of heat and electricity, for example, brass. These constitute elements of the rectifier and may be given any physical form affording an arrangement of the different contacting surfaces in the order shown. In the arrangement illustrated the elements 1, 3 and 4 are mounted within a cylindrical casing 5 of insulating material threaded at its ends to take the threaded terminal plugs 6 of suitable conducting material such as brass or copper, which, through the interposed spring washer 7, hold the elements in place and in contact under constant pressure, compensating for expansion and contraction of the parts due to temperature changes.

By the process of the present invention, a specially prepared sulphide coating is provided on the electropositive or aluminum electrode. In rectifiers of the dry surface-contact variety it was heretofore found that the variable contact resistance at the rectifying film is the fundamental factor which prevents efficient or practical operation. This variation in resistance in the rectifying film is due to the reaction which here takes place, namely, dry contact electrolysis, in which a film is formed by the passage of an inverse current through the contacting surfaces of aluminum and a sulphur-bearing compound. The density of the film thus produced is limited for the reason that just as soon as a slight film is formed it serves to prevent the further formation of film. Regardless of how high an inverse potential is used in forming the film, the initially formed film is accompanied by a resistance product which insulates and reduces the inverse film-forming current to such a low value that the film necessary to withstand continuous alternating current operation cannot be formed.

It has been found that a desired coating of a compound of aluminum containing a sulphide having the desired density may be formed on the aluminum electrode before assembling the elements by chemical process, and that the assembled rectifier unit with a coating so formed will coact to impart substantially unilaterally conductive or rectifying properties without the necessity of first passing an inverse current for any material forming period, its alternating current operation being substantially constant without sparking between the sulphide and the aluminum. The word "density" is here used, not in its restricted sense as meaning mass per unit of volume or specific gravity, but in a broad sense to indicate thickness or durability as to operating strength or resistance to overload break-down.

The method of producing this dense, highly efficient preformed coating consists in subjecting the aluminum electrode to a bath of alkaline sulphide, such as sodium sulphide heated to about 100° C., the aluminum electrode being made the anode in a current path through the sulphide solution to a suitable cathode such as brass or nickel, which current is supplied from a suitable source with variable potential. The potential is increased with increasing strength or density of the coating up to a voltage higher than that used in the application of the unit. It has been observed that a difference of potential of 35 volts will produce a dense and efficient coating. When the potential to be applied to the units is of low value, the electrolytic method of formation need not be used, since by boiling the aluminum electrodes in a concentrated solution of sodium sulphide, a coating of sufficient density is formed, or where a slight coating is sufficient, heating is not required.

An arrangement of apparatus for carrying out the electrolytic process of forming the coating is indicated diagrammatically in Fig. 5, in which 8 indicates a vessel of suitable heat-resisting and transparent material, such as thin tempered glass, for example, glass sold under the trade name of Pyrex, which vessel contains a concentrated solution of sodium sulphide in which the aluminum element 9 to be coated and a cathode element 10 of brass or copper are immersed. The aluminum electrode 9 is connected through the conductor 11, milliammeter 12 and conductor 13 to the positive terminal of a variable potential battery 14, while the anode element 10 is connected through conductor 15 to the variable contactor 16 adapted to engage different taps on the negative side of the battery 14. The purpose of the transparent container 8 is to enable the physical condition of the coating to be observed during the progress of the coating process, and the purpose of the milliammeter is to indicate the electrical characteristics of the coating during the process, the potential being applied until the meter indicates a negligible current flow.

By the present invention an element of cupric sulphide (CuS) is prepared and used as the adjacent electrode element and teaches a method of producing it, which gives it improved electrical characteristics. In the course of the development of the present invention it was found that a highly efficient and stable rectifier for use under practical conditions requiring a wide margin of safety as to overload, extended use, etc., could not be produced with an electrode element of ordinary cuprous sulphide ($Cu_2S$). On the other hand, cupric sulphide (CuS), especially that produced by the method to be hereinafter described, has been found to have the necessary qualities to satisfy commercial requirements.

The method of producing the plates or disks of cupric sulphide consists in heating the copper in the form of a metallic copper plate of a thickness, for example, of about 5 milliammeters, in sulphur vapors in a non-oxidizing atmosphere at a temperature substantially above 150° C., preferably about 450° C. Under this treatment the entire copper plate becomes converted into a cupric sulphide plate, taking the form of a hard, blue to blackish, solid, metal-like material having rectifying and other electrical characteristics, for example, relatively low resistance, which make it much superior to cuprous sulphide (hemisulphide) or ordinary cupric sulphate otherwise produced. In the method above described the thickness of the initial copper plate and the temperature at which it is exposed to the sulphur vapor, are important factors in the process. A temperature above the minimum specified is found to be necessary to insure the prevention of the formation of cuprous sulphide ($Cu_2S$) and yield the necessary solid cupric sulphide (CuS).

The rectifiers made of the elements of the present invention may be used to derive direct current from any suitable commercial source of alternating current. As a single rectifying couple is essentially a low-voltage device, a step-down transformer, such as shown at 20 in Fig. 2, is preferably employed in order to use the couples in conjunction with commercial sources of alternating current. In Fig. 2 the transformer 20 has its primary 21 connected to such source at 22, and its secondary winding 23, which is a split winding, connected through a filter circuit, consisting of the inductance 24 and condensers 25 and 25ª with a pair of rectifiers 26 and 27. The terminals of the condensers 25 and 25ª are connected to the direct current output terminals 28 and 29, which in operation are connected or bridged by the desired direct current consumption device, not shown. It will be seen that with the rectifying devices 26 and 27 connected to rectify in the direction indicated by the adjacent arrows, both sides of the cycle of the alternating currents induced in the winding 23 are rectified into unidirectional pulsating current which is smoothed out into a substantially uniform direct current by the action of the inductance 24 and condenser 25.

In Fig. 3 is shown a form of rectifier designed for commercial use where large current capacity is required. This consists essentially of the same elements as that of Fig. 1, but with greater contact or operating area and with means for facilitating the radiation of heat. More specifically, it comprises a central electrode 34 of copper, having both extended surfaces in contact with plates 33 of cupric sulphide (CuS), which, in turn, have their outer or remote faces in contact with a pair of aluminum electrodes 31, the whole being clamped together by clamping bolts 36 and maintained under constant pressure by spring washers 37.

The arrangement of Fig. 4 is the same as that of Fig. 1 in all respects except that the group of elements 1, 3 and 4 is repeated a number of times and the cylindrical casing 5 made sufficiently long to accommodate a plurality of groups. This arrangement is intended for use in relatively high potential circuits, such as the standard 110-volt circuit without the use of a step-down transformer, the number of couples varying according to the voltage.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent, is:

1. The method of forming a dense homogeneous coating containing a sulphide and a body of electro-positive metal adapted for use as an electrode element in a dry surface contact rectifier having a cooperating sulphur containing electrode, which comprises subjecting said body of electro-positive metal to the action of a solution containing the sulphide of an alkaline metal while heated to a temperature of approximately 100 degrees C. and maintaining said body of metal at an electrical potential positive with respect to said solution.

2. The method of forming a dense homogeneous coating containing a sulphide on a body of electro-positive metal adapted for use as an electrode element in a dry contact rectifier having a cooperating sulphur containing electrode, which comprises subjecting said body of electro-positive metal to the action of a solution containing sodium sulphide while heated to a temperature of approximately 100 degrees C., and maintaining said body at an electrical potential positive with respect to said solution until the current flow resulting from said potential reaches a value approaching a minimum.

In testimony whereof I affix my signature.

SAMUEL RUBEN.